United States Patent
Oota et al.

(10) Patent No.: US 10,562,276 B2
(45) Date of Patent: Feb. 18, 2020

(54) INTERLAYER FILM FOR LAMINATED GLASS, AND LAMINATED GLASS

(71) Applicant: SEKISUI CHEMICAL CO., LTD., Osaka (JP)

(72) Inventors: Yuusuke Oota, Shiga (JP); Yasuyuki Izu, Shiga (JP); Daisuke Nakajima, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/323,227

(22) PCT Filed: Sep. 29, 2015

(86) PCT No.: PCT/JP2015/077456
§ 371 (c)(1),
(2) Date: Dec. 30, 2016

(87) PCT Pub. No.: WO2016/052478
PCT Pub. Date: Apr. 7, 2016

(65) Prior Publication Data
US 2017/0136742 A1 May 18, 2017

(30) Foreign Application Priority Data

Sep. 29, 2014 (JP) .................................. 2014-199396

(51) Int. Cl.
*B32B 17/10* (2006.01)
*C08K 3/08* (2006.01)
(Continued)

(52) U.S. Cl.
CPC ........ *B32B 17/10568* (2013.01); *B32B 3/263* (2013.01); *B32B 7/04* (2013.01);
(Continued)

(58) Field of Classification Search
CPC .................. B32B 17/10568; B32B 17/10036
(Continued)

(56) References Cited

U.S. PATENT DOCUMENTS

| 4,791,336 A | * | 12/1988 | Morimoto | .......... | C09K 11/7702 |
| | | | | | 252/301.4 H |
| 2009/0294212 A1* | | 12/2009 | Miyai | ............... | B32B 17/10568 |
| | | | | | 181/289 |

(Continued)

FOREIGN PATENT DOCUMENTS

| EP | 3 176 136 | 6/2017 |
| EP | 3 192 776 | 7/2017 |

(Continued)

OTHER PUBLICATIONS

Machine_English_translation_JP_2013001613_A; Iwamoto, T.; Interlayer for Laminated Glass and Laminated Glass; Jan. 7, 2013; JPO; whole document.*

(Continued)

*Primary Examiner* — Tahseen Khan
(74) *Attorney, Agent, or Firm* — Wenderoth, Lind & Ponack, L.L.P.

(57) ABSTRACT

The present invention aims to provide an interlayer film for laminated glass which prevents a double image phenomenon in a specific area of laminated glass and enables display of high contrast images at a luminance within a certain range. The present invention also aims to provide a laminated glass including the interlayer film for laminated glass. The present invention relates to an interlayer film for laminated glass, having a multilayer structure including a luminescent layer and a resin layer on at least one surface of the luminescent layer. The luminescent layer contains a thermoplastic resin, a plasticizer, and a luminescent material. The resin layer contains a thermoplastic resin and a plasticizer. The interlayer film for laminated glass has a wedge-shaped cross-sectional shape. The luminescent layer has a difference between the maximum thickness and the minimum thickness of 100 μm or less.

12 Claims, 1 Drawing Sheet

(51) Int. Cl.

| | | |
|---|---|---|
| B32B 7/04 | (2019.01) | |
| B32B 27/30 | (2006.01) | |
| B32B 27/20 | (2006.01) | |
| B32B 27/40 | (2006.01) | |
| B32B 27/08 | (2006.01) | |
| B32B 3/26 | (2006.01) | |
| B32B 27/42 | (2006.01) | |
| B32B 27/22 | (2006.01) | |
| B32B 27/36 | (2006.01) | |
| B32B 27/18 | (2006.01) | |

(52) U.S. Cl.
CPC .. *B32B 17/10036* (2013.01); *B32B 17/10669* (2013.01); *B32B 17/10688* (2013.01); *B32B 17/10761* (2013.01); *B32B 27/08* (2013.01); *B32B 27/18* (2013.01); *B32B 27/20* (2013.01); *B32B 27/22* (2013.01); *B32B 27/304* (2013.01); *B32B 27/306* (2013.01); *B32B 27/308* (2013.01); *B32B 27/36* (2013.01); *B32B 27/40* (2013.01); *B32B 27/42* (2013.01); *B32B 2250/02* (2013.01); *B32B 2250/03* (2013.01); *B32B 2250/04* (2013.01); *B32B 2250/05* (2013.01); *B32B 2250/24* (2013.01); *B32B 2250/246* (2013.01); *B32B 2250/40* (2013.01); *B32B 2264/102* (2013.01); *B32B 2307/102* (2013.01); *B32B 2307/4026* (2013.01); *B32B 2307/412* (2013.01); *B32B 2307/422* (2013.01); *B32B 2307/732* (2013.01); *B32B 2457/20* (2013.01); *B32B 2605/00* (2013.01); *B32B 2605/08* (2013.01)

(58) Field of Classification Search
USPC ........................................................ 428/172
See application file for complete search history.

(56) References Cited

U.S. PATENT DOCUMENTS

| | | | | |
|---|---|---|---|---|
| 2012/0068083 | A1* | 3/2012 | Labrot | B32B 17/10 250/461.1 |
| 2012/0133904 | A1* | 5/2012 | Akiyama | G02B 27/102 353/38 |
| 2012/0162752 | A1* | 6/2012 | Kitano | B32B 17/10761 359/361 |
| 2012/0299328 | A1 | 11/2012 | Labrot et al. | |
| 2013/0050983 | A1 | 2/2013 | Labrot et al. | |
| 2013/0242562 | A1 | 9/2013 | Labrot | |
| 2013/0252001 | A1* | 9/2013 | Sablayrolles | B32B 17/10669 428/437 |
| 2013/0323517 | A1* | 12/2013 | Kitano | B32B 17/10633 428/437 |
| 2014/0178651 | A1* | 6/2014 | Miyai | B32B 17/10568 428/172 |

FOREIGN PATENT DOCUMENTS

| | | |
|---|---|---|
| JP | 3-209210 | 9/1991 |
| JP | 4-502525 | 5/1992 |
| JP | 2000-44296 | 2/2000 |
| JP | 2007-223883 | 9/2007 |
| JP | 2008-532917 | 8/2008 |
| JP | 2013001613 A * | 1/2013 |
| JP | 2014-24313 | 2/2014 |
| JP | 2014024312 A * | 2/2014 |
| JP | 5503089 | 5/2014 |
| WO | 91/06031 | 5/1991 |
| WO | 94/00787 | 1/1994 |
| WO | 2006/101960 | 9/2006 |
| WO | 2007/132777 | 11/2007 |
| WO | 2010/139889 | 12/2010 |
| WO | 2011/042384 | 4/2011 |
| WO | 2012/010444 | 1/2012 |
| WO | 2012/038170 | 3/2012 |

OTHER PUBLICATIONS

Nakajima, D., et. al. Luminescent Sheet, Intermediate Film for Laminated Glass, and Laminated Glass; Feb. 6, 2014; EPO; whole document (Year: 2014).*

Extended European Search Report dated Mar. 20, 2018 in European Application No. 15847799.2.

International Search Report dated Dec. 28, 2015 in corresponding International (PCT) Application No. PCT/JP2015/077456.

* cited by examiner

INTERLAYER FILM FOR LAMINATED GLASS, AND LAMINATED GLASS

TECHNICAL FIELD

The present invention relates to an interlayer film for laminated glass which prevents a double image phenomenon in a specific area of a laminated glass and enables display of high contrast images at a luminance within a certain range. The present invention also relates to a laminated glass including the interlayer film for laminated glass.

BACKGROUND ART

For improved safety, for example, demand has recently been growing for head-up displays (HUDs) that present meters showing driving data (e.g., speed information) within the driver's field of vision on the automotive windshield.

To date, various HUD systems have been developed. In one exemplary HUD, no HUD display unit is provided on the windshield surface, and information (e.g., speed information) sent from the control unit is reflected on the windshield from a display unit of the instrumental panel, so that the driver can view information on the windshield (i.e., within the driver's field of vision on the windshield). This reflection-type HUD allows, with appropriate adjustment of the focal length, the displayed information to appear distant. This eliminates the need for the driver to change the focus of his or her eyes, offering safety advantages.

Patent Literature 1 discloses a laminated glass including two transparent sheets and an interlayer therebetween, where the interlayer contains hydroxy terephthalate as a luminescent material. The laminated glass of Patent Literature 1 displays high contrast images under irradiation with light. In view of advantages of the respective HUDs, combining a HUD using such a laminated glass including a luminescent material with a reflection-type HUD has been demanded. However, since the laminated glass disclosed in Patent Literature 1 includes two parallel glass sheets, a windshield formed of such a laminated glass may cause a double image phenomenon of the meters in the driver's field of vision.

CITATION LIST

Patent Literature

Patent Literature 1: WO 2010/139889

SUMMARY OF INVENTION

Technical Problem

On the basis of the invention of Patent Literature 1, the present inventors considered adding a luminescent material to a wedge-shaped interlayer film for laminated glass having a specific wedge angle. With adjustment of the wedge angle, a laminated glass including such an interlayer film for laminated glass with a wedge-shaped cross-sectional shape can combine a meter image reflected on one glass sheet with that reflected on the other glass sheet at one point in the driver's field of vision. Such a laminated glass is thus known to solve the issue of the double image phenomenon of the meters.

However, actual use of the interlayer film for laminated glass having a wedge-shaped cross-sectional shape and containing a luminescent material poses a new problem that the images displayed by the luminescent material have different luminances at difference portions on the laminated glass.

In view of the above situation, the present invention aims to provide an interlayer film for laminated glass which prevents a double image phenomenon in a specific area of a laminated glass and enables display of high contrast images at a luminance within a certain range. The present invention also aims to provide a laminated glass including the interlayer film for laminated glass.

Solution to Problem

The present invention provides an interlayer film for laminated glass, having a multilayer structure including a luminescent layer and a resin layer on at least one surface of the luminescent layer, the luminescent layer containing a thermoplastic resin, a plasticizer, and a luminescent material, the resin layer containing a thermoplastic resin and a plasticizer, the interlayer film for laminated glass having a wedge-shaped cross-sectional shape, the luminescent layer having a difference between a maximum thickness and a minimum thickness of 100 μm or less.

In the following, the present invention will be described in detail.

The present inventors examined why displayed images have different luminances on a laminated glass that includes an interlayer film for laminated glass having a wedge-shaped cross-sectional shape and containing a luminescent material. They found out that it is because such an interlayer film for laminated glass with a wedge-shaped cross-sectional shape in the thickness direction has higher surface density of the fluorescent material at the thick portion than at the thin portion.

After further intensive studies, the present inventors found out that a laminated glass capable of displaying images at a luminance within a certain range while preventing a double image phenomenon can be obtained by the following: reducing the variation in the surface density of the fluorescent material below a certain level by adjusting the difference between the maximum and minimum thicknesses of the luminescent layer containing the luminescent material to 100 μm or less; employing a multilayer structure including resin layers laminated together; and adjusting the cross-sectional shape of the entire interlayer film for laminated glass to a wedge shape. The inventors thus completed the present invention.

First, the shape of the interlayer film for laminated glass of the present invention will be described in detail below.

The interlayer film for laminated glass of the present invention has a wedge-shaped cross-sectional shape. Adjustment of the wedge angle θ of the wedge shape depending on the mounting angle of the laminated glass enables display of images without a double image phenomenon. In order to further reduce the double image phenomenon, the lower limit of the wedge angle θ is preferably 0.1 mrad, more preferably 0.2 mrad, still more preferably 0.3 mrad. The upper limit thereof is preferably 1 mrad, more preferably 0.9 mrad.

When, for example, an interlayer film for laminated glass with a wedge-shaped cross-sectional shape is produced by extrusion-molding of a resin composition with an extruder, the interlayer film may have a shape that has its minimum thickness in a region slightly inward from a first end on the thin side (specifically, a region spaced inward from the first end by a distance of 0X to 0.2X where X is the distance between the first end and a second end on the thick side) and has its maximum thickness in a region slightly inward from the second end on the thick side (specifically, a region spaced inward from the second end by a distance of 0X to 0.2X where X is the distance between the first end and the second end). Such a shape herein is included in the wedge shape.

The interlayer film for laminated glass of the present invention has a multilayer structure including a luminescent layer containing a luminescent material and a resin layer (hereinafter also referred to as "shape-adjusting layer"). The cross-sectional shape of the entire interlayer film for laminated glass is adjusted to a wedge shape by adjusting the thickness of the luminescent layer within a certain range and laminating the shape-adjusting layer on the luminescent layer.

The shape-adjusting layer may be laminated on only one side of the luminescent layer, or may be laminated on both sides of the luminescent layer. Multiple shape-adjusting layers may be laminated on the luminescent layer.

The luminescent layer may have a wedge-shaped or rectangular cross-sectional shape. The luminescent layer preferably has a wedge-shaped cross-sectional shape. For a HUD using a laminated glass including the interlayer film for laminated glass according to the present invention, it is preferred to dispose the laminated glass such that the minimum thickness of the luminescent layer is located at the lower portion of the HUD and the maximum thickness thereof is located at the upper portion of the HUD, and to dispose the light source of a reflection-type HUD near the lower portion and dispose the excitation light source of a luminescence-type HUD near the upper portion. In such a case, with the self-luminous layer having a wedge shape, the thin portion of the self-luminous layer is located near the light source of the reflection-type HUD. This prevents unexpected luminescence of the luminescent material even if the light from the light source of the reflection-type HUD includes excitation light for the luminescent material, thus allowing clear display of images of the reflection-type HUD. Furthermore, with the self-luminous layer having a wedge shape, the upper portion of the HUD, which is close to the excitation light source of the luminescence-type HUD, can have enough luminescent material to display clear images, thus allowing clear display of images of the luminescence-type HUD.

The difference between the maximum thickness and the minimum thickness of the luminescent layer is 100 µm or less. This allows display of images at a luminance within a certain range. The difference between the maximum and minimum thicknesses of the luminescent layer is preferably 95 µm or less, more preferably 90 µm or less, still more preferably 60 µm or less, particularly preferably 50 µm or less. The lower limit of the difference between the maximum and minimum thicknesses of the luminescent layer is not limited, but is preferably 0.

The thickness of the luminescent layer is not limited. The lower limit thereof is preferably 50 µm, and the upper limit thereof is preferably 700 µm. When the thickness of the luminescent layer is within this range, sufficiently high contrast images can be displayed. The lower limit of the thickness of the luminescent layer is more preferably 70 µm, and the upper limit is more preferably 400 µm. The lower limit is still more preferably 80 µm, and the upper limit is still more preferably 150 µm. The "lower limit of the thickness of the luminescent layer" means the thickness of the thinnest portion of the luminescent layer. The "upper limit of the thickness of the luminescent layer" means the thickness of the thickest portion of the luminescent layer.

The shape-adjusting layer is laminated on the luminescent layer and serves to adjust the cross-sectional shape of the entire interlayer film for laminated glass to a wedge shape. The cross-sectional shape of the entire interlayer film for laminated glass is preferably a wedge shape with a certain wedge angle. The cross-sectional shape of the entire interlayer film for laminated glass does not need to have a certain wedge angle as long as it is a wedge shape.

The shape-adjusting layer preferably has a wedge-shaped, triangular, or trapezoidal cross-sectional shape.

By laminating a shape-adjusting layer with a wedge-shaped, triangular, or trapezoidal cross-sectional shape, the cross-sectional shape of the entire interlayer film for laminated glass can be adjusted to a wedge shape. The shape-adjusting layer may have, for example, a pentagonal, hexagonal, or oval shape as long as it can serve as the shape-adjusting layer. Multiple shape-adjusting layers may be combined to adjust the cross-sectional shape of the entire interlayer film for laminated glass. In this case, it is not necessary that all the shape-adjusting layers have the same cross-sectional shape, and they may have different cross-sectional shapes.

The thickness of the shape-adjusting layer is not limited. From the viewpoint of the actual use and sufficient enhancement of the adhesion and the penetration resistance, the lower limit thereof is preferably 10 µm, and the upper limit thereof is preferably 1000 µm. The lower limit is more preferably 200 µm, and the upper limit is more preferably 800 µm. The lower limit is still more preferably 300 µm.

The "lower limit of the thickness of the shape-adjusting layer" means the thickness of the thinnest portion of the shape-adjusting layer. The "upper limit of the thickness of the shape-adjusting layer" means the thickness of the thickest portion of the shape-adjusting layer. When multiple shape-adjusting layers are used in combination, the "lower limit of the thickness of the shape-adjusting layer" and the "upper limit of the thickness of the shape-adjusting layer" each mean the total thickness.

The thickness of the entire interlayer film for laminated glass of the present invention is not limited. The lower limit thereof is preferably 100 µm, and the upper limit thereof is preferably 3000 µm. The lower limit is more preferably 250 µm, and the upper limit is more preferably 2000 µm. The lower limit is still more preferably 500 µm, and the upper limit is still more preferably 1500 µm. The lower limit is particularly preferably 800 µm.

The "lower limit of the thickness of the entire interlayer film for laminated glass" means the thickness of the thinnest portion of the entire interlayer film for laminated glass. The "upper limit of the thickness of the interlayer film for laminated glass" means the thickness of the thickest portion of the entire interlayer film for laminated glass.

FIGS. 1 to 3 are schematic views illustrating exemplary examples of the interlayer film for laminated glass of the present invention. In FIGS. 1 to 3, for convenience of illustration, the thickness of the interlayer film for laminated glass, the thickness of the layers constituting the interlayer film for laminated glass, and the wedge angle θ are different from actual thickness or actual wedge angle:

FIG. 1 illustrates a cross section in the thickness direction of an interlayer film 1 for laminated glass.

The interlayer film 1 for laminated glass has a two-layer structure including a luminescent layer 11 containing a luminescent material and a shape-adjusting layer 12 laminated on one side of the layer 11.

The luminescent layer 11 is rectangular, whereas the shape-adjusting layer 12 is wedge-shaped, triangular, or trapezoidal. Thus, the entire interlayer film 1 for laminated glass has a wedge shape with a wedge angle θ of 0.1 to 1 mrad.

FIG. 2 illustrates a cross section in the thickness direction of an interlayer film 2 for laminated glass.

The interlayer film 2 for laminated glass has a three-layer structure including a luminescent layer 21 containing a luminescent material and shape-adjusting layers 22 and 23 laminated on both sides of the layer 21.

The luminescent layer 21 and the shape-adjusting layer 23 are rectangular with a uniform thickness, whereas the shape-adjusting layer 22 is wedge-shaped, triangular, or trapezoidal. Thus, the entire interlayer film 2 for laminated glass has a wedge shape with a wedge angle θ of 0.1 to 1 mrad.

FIG. 3 illustrates a cross section in the thickness direction of an interlayer film 3 for laminated glass.

The interlayer film 3 for laminated glass has a three-layer structure including a luminescent layer 31 containing a luminescent material and shape-adjusting layers 32 and 33 laminated on both sides of the layer 31.

The luminescent layer 31 has a gentle wedge shape with a difference between the maximum thickness and the minimum thickness of 100 μm or less, and the wedge-shaped shape-adjusting layers 32 and 33 are laminated thereon. Thus, the entire interlayer film 3 for laminated glass has a wedge shape with a wedge angle θ of 0.1 to 1 mrad.

Next, the components constituting the luminescent layer and the shape-adjusting layer of the interlayer film for laminated glass of the present invention will be described in detail.

The luminescent layer contains a thermoplastic resin, a plasticizer, and a luminescent material. The luminescent layer containing a luminescent material allows the interlayer film for laminated glass of the present invention to display high contrast images under light irradiation.

The thermoplastic resin is not limited. Examples thereof include thermoplastic resins such as polyvinyl acetal resin, ethylene-vinyl acetate copolymer resin, ethylene-acryl copolymer resin, polyurethane resin, sulfur element-containing polyurethane resin, polyvinyl alcohol resin, vinyl chloride resin, and polyethylene terephthalate resin. Preferred among these is polyvinyl acetal resin because when it is used in combination with a plasticizer, the resulting interlayer film for laminated glass can have excellent adhesiveness to glass.

The polyvinyl acetal resin may be any polyvinyl acetal resin produced by acetalizing polyvinyl alcohol with an aldehyde, and is preferably polyvinyl butyral resin. Two or more of polyvinyl acetal resins may be used in combination according to need.

The lower limit of the degree of acetalization of the polyvinyl acetal resin is preferably 40 mol %, and the upper limit thereof is preferably 85 mol %. The lower limit thereof is more preferably 60 mol %, and the upper limit thereof is more preferably 75 mol %.

The lower limit of the hydroxy group content of the polyvinyl acetal resin is preferably 10 mol %, and the upper limit thereof is preferably 32 mol %. When the hydroxy group content of the polyvinyl acetal resin in the luminescent layer is within this range, the formation of the luminescent layer is facilitated, and the resulting interlayer film for laminated glass has high penetration resistance. The lower limit of the hydroxy group content of the polyvinyl acetal resin is more preferably 15 mol %, and the upper limit thereof is more preferably 30 mol %. The lower limit is still more preferably 18 mol %, and the upper limit is still more preferably 28 mol %. The lower limit is particularly preferably 20 mol %, and the upper limit is particularly preferably 25 mol %.

The degree of acetalization and the hydroxy group content can be determined in accordance with JIS K6728 "Polyvinyl Butyral Test Method".

The polyvinyl acetal resin can be prepared by acetalizing polyvinyl alcohol with an aldehyde.

The polyvinyl alcohol is usually prepared by saponifying polyvinyl acetate. Polyvinyl alcohol with a degree of saponification of 70 to 99.8 mol % is usually used. The degree of saponification of the polyvinyl alcohol is preferably 80 to 99.8 mol %.

The lower limit of the degree of polymerization of the polyvinyl alcohol is preferably 500, and the upper limit thereof is preferably 4000. When the degree of polymerization of the polyvinyl alcohol is 500 or greater, the laminated glass to be obtained has high penetration resistance. When the degree of polymerization of the polyvinyl alcohol is 4000 or less, the formation of the interlayer film for laminated glass is facilitated. The lower limit of the degree of polymerization of the polyvinyl alcohol is more preferably 1000, and the upper limit thereof is more preferably 3600.

The aldehyde is not limited. Commonly, a C1 to C10 aldehyde is suitably used. Any C1 to C10 aldehyde may be used, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

The plasticizer is not limited. Examples thereof include organic ester plasticizers such as monobasic organic acid esters and polybasic organic acid esters and phosphoric acid plasticizers such as organophosphate plasticizers and organophosphite plasticizers. The plasticizer is preferably a liquid plasticizer.

The monobasic organic acid esters are not limited. Examples thereof include glycol esters obtained by a reaction of a glycol (e.g., triethylene glycol, tetraethylene glycol, tripropylene glycol) with a monobasic organic acid (e.g., butyric acid, isobutyric acid, caproic acid, 2-ethylbutyric acid, heptanoic acid, n-octylic acid, 2-ethylhexylic acid, pelargonic acid (n-nonylic acid), decylic acid). In particular, preferred are triethylene glycol dicaproate, triethylene glycol di-2-ethylbutyrate, triethylene glycol di-n-octylate, and triethylene glycol di-2-ethylhexanoate.

The polybasic organic acid esters are not limited. Examples thereof include ester compounds of a polybasic organic acid (e.g., adipic acid, sebacic acid, azelaic acid) with a C4-C8 linear or branched alcohol. In particular, preferred are dibutyl sebacate, dioctyl azelate, and dibutyl carbitol adipate.

The organic ester plasticizers are not limited. Examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, diisononyl adipate, heptylnonyl adipate, dibutyl sebacate, oil-modified sebacic alkyds, mixtures of phosphates and adipates, adipates, mixed type adipates prepared from C4-C9 alkyl alcohols and C4-C9 cyclic alcohols, and C6-C8 adipates such as hexyl adipate.

The organophosphate plasticizer is not limited. Examples thereof include tributoxyethyl phosphate, isodecylphenyl phosphate, and triisopropyl phosphate.

For less hydrolysis, the plasticizer preferably contains triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), particularly preferably triethylene glycol di-2-ethylhexanoate.

The plasticizer content of the luminescent layer is not limited. The lower limit of the plasticizer content is preferably 30 parts by weight, and the upper limit thereof is preferably 100 parts by weight based on 100 parts by weight of the polyvinyl acetal resin. When the plasticizer content is 30 parts by weight or more, the interlayer film for laminated glass has low melt viscosity, which leads to high deaeration properties in the production of a laminated glass including the interlayer film for laminated glass. When the plasticizer content is 100 parts by weight or less, the interlayer film for laminated glass has high transparency. The lower limit of the plasticizer content is more preferably 35 parts by weight, and the upper limit thereof is more preferably 80 parts by weight. The lower limit is still more preferably 45 parts by weight, and the upper limit is still more preferably 70 parts by weight. The lower limit is particularly preferably 50 parts by weight, and the upper limit is particularly preferably 63 parts by weight.

The luminescent material is at least one selected from the group consisting of luminescent particles, luminescent pigments, and luminescent dyes.

Examples of the luminescent particles and the luminescent pigments include fluorescent materials represented by $Y_2O_2S$:Eu, $BaMg_2Al_{16}O_{27}$:Eu,Mn, $(SrCaBaMg)_5(PO_4)_3Cl$:Eu, $BaMg_2Al_{16}O_{27}$:Eu, $BaMg_2Al_{16}O_{27}$:Eu, $Sr_5(PO_4)_3Cl$:Eu, $LaPO_4$:Ce, Tb, $MgAl_{11}O_{19}$:Ce, Tb, $Y_2O_3$:Eu, $Y(PV)O_4$:Eu, $3.5MgO.0.5MgF_2.GeO_2$:Mn, $Ca_{10}(PO_4)_6FCl$:Sb, Mn, $Sr_{10}(PO_4)_6FCl$:Sb, Mn, $(SrMg)_2P_2O_7$:Eu, $Sr_2P_2O_7$:Eu, $CaWO_4$, $CaWO_4$:Pb, $MgWO_4$, $(Baca)_5(PO_4)_3Cl$:EU, $Sr_4Al_{14}O_{25}$:Eu, and $Zn_2SiO_4$:Mn, composites containing these materials, and particles such as ZnS particles, GaSe particles, SiC particles, and CdTe particles.

Examples of the luminescent dyes include (carbazole-naphthalimide) dyes, (acetonitrile-triphenyleneamine) dyes, arylsulfonate cyanine dyes, perylene dyes, coumarin dyes, and tris(4,4,4-trifluoro-1-(2-thienyl)-1,3-butanedionato-O, O')bis(triphenylphosphineoxide-O-)europium.

Particularly suitable luminescent dyes are compound having a naphthalimide skeleton and compounds having a coumarin skeleton. Compounds having a naphthalimide skeleton and compounds having a coumarin skeleton are highly compatible with the thermoplastic resin used as a binder resin. These compounds thus can be uniformly dispersed in the binder resin, allowing the resulting interlayer film for laminated glass to have high transparency and low haze. Furthermore, the compounds having a naphthalimide skeleton and the compounds having a coumarin skeleton are excellent in durability against ultraviolet rays. An interlayer film for laminated glass containing any of these compounds thus can exhibit excellent light resistance.

Specific examples of the compounds having a naphthalimide skeleton include 4-bromo-1,8-naphthalimide, 4-amino-1,8-naphthalimide, 4-methoxy-N-methylnaphthalic acid imide, naphthalimide, 4-aminonaphthalimide, N-methyl-4-aminonaphthalimide, N-ethyl-4-aminonaphthalimide, N-propyl-4-aminonaphthalimide, N-n-butyl-4-aminonaphthalimide, 4-acetylaminonaphthalimide, N-methyl-4-acetylaminonaphthalimide, N-ethyl-4-acetylaminonaphthalimide, N-propyl-4-acetylaminonaphthalimide, N-n-butyl-4-acetylaminonaphthalimide, N-methyl-4-methoxynaphthalimide, N-ethyl-4-methoxynaphthalimide, N-propyl-4-methoxynaphthalimide, N-n-butyl-4-methoxynaphthalimide, N-methyl-4-ethoxynaphthalimide, N-ethyl-4-ethoxynaphthalimide, N-propyl-4-ethoxynaphthalimide, N-n-butyl-4-ethoxynaphthalimide, Lumogen F Violet 570 (available from BASF Japan Ltd.), and Lumogen F Blue 650 (available from BASF Japan Ltd.).

Specific examples of the compounds having a coumarin skeleton include derivatives containing an electron-donating substituent at the 7-position of the coumarin ring. More specific examples include: derivatives containing an amino group at the 7-position of the coumarin ring, including coumarin colorants such as 3-(2'-benzothiazolyl)-7-diethylaminocoumarin (coumarin 6), 3-(2'-benzimidazolyl)-7-N,N-diethylaminocoumarin (coumarin 7), 3-(2'-N-methylbenzimidazolyl)-7-N,N-diethylaminocoumarin (coumarin 30), and 2,3,5,6-1H,4H-tetrahydro-8-trifluoromethylquinolizine (9,9a,1-gh)coumarin (coumarin 153) and coumarin colorant dyes such as Basic Yellow 51; and derivatives containing an hydroxy group at the 7-position of the coumarin ring, including 7-hydroxycoumarin, 3-cyano-7-hydroxycoumarin, 7-hydroxy-4-methylcoumarin, 7-diethylamino-4-methylcoumarin, 7-dimethylaminocyclopenta[c]-coumarin, 1,2,4,5,3H,6H,10H-tetrahydro-8-methyl[l]benzopyrano[9,9a,1-gH]quinolizin-10-on, 7-amino-4-trifluoromethylcoumarin, 1,2,4,5,3H,6H,10H-tetrahydro-9-cyano[1]benzopyrano[9,9a,1-gH]quinolizin-10-on, 1,2,4,5,3H,6H,10H-tetrahydro-9-carbo-t-butoxy[1]benzopyrano[9,9a,1-gH]quinolizin-10-on, 7-ethylamino-6-methyl-4-trifluoromethylcoumarin, 1,2,4,5,3H,6H,10H-tetrahydro-9-carboethoxy[1]benzopyrano[9,9a,1-gH]quinolizin-10-on, 7-diethylamino-3-(1-methylbenzimidazolyl)coumarin, 7-dimethylamino-4-trifluoromethylcoumarin, 1,2,4,5,3H,6H, 10H-tetrahydro-9-carboxy[1]benzopyrano[9,9a,1-gH]quinolizin-10-on, 1,2,4,5,3H,6H,10H-tetrahydro-9-acetyl[1] benzopyrano[9,9a,1-gH]quinolizin-10-on, 3-(2-benzimidazolyl)-7-N,N-diethylaminocoumarin, 1,2,4,5,3H, 6H,10H-tetrahydro-8-trifluoromethyl[1]benzopyrano[9,9a, 1-gH]quinolizin-10-on, 3-(2-benzothiazoly)-7-diethylaminocoumarin, 7-diethylaminocoumarin, 7-diethylamino-4-trifluoromethylcoumarin, 2,3,6,7-tetrahydro-9-(trifluoromethyl)-1H,5H,11H-[1]benzopyrano[6,7, 8-ij]quinolizin-11-on, 7-amino-4-methylcoumarin, and 4,6-dimethyl-7-ethylaminocoumarin.

The luminescent material is preferably a luminescent material having a terephthalate structure. Examples of the luminescent material having a terephthalate structure include compounds represented by Formula (1) below and compounds represented by Formula (2) below. These compounds may be used alone or in combination of two or more thereof.

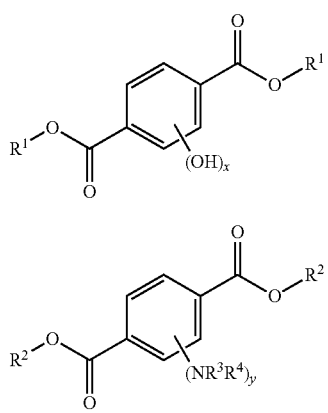

In Formula (1), $R^1$ represents an organic group, and x is 1, 2, 3, or 4. For even higher transparency of the interlayer film for laminated glass, preferably x is 1 or 2; more preferably the compound has a hydroxy group at the 2- or 5-position of the benzene ring; and still more preferably the compound has hydroxy groups at the 2- and 5-positions of the benzene ring.

The organic group $R^1$ is preferably a hydrocarbon group, more preferably a C1-C10 hydrocarbon group, still more preferably a C1-C5 hydrocarbon group, particularly preferably a C1-C3 hydrocarbon group. When the hydrocarbon group contains 10 or less carbon atoms, the luminescent material having a terephthalate structure can be easily dispersed in the interlayer film for laminated glass. The hydrocarbon group is preferably an alkyl group.

Examples of the compounds having the structure represented by Formula (1) include diethyl-2,5-dihydroxyterephthalate and dimethyl-2,5-dihydroxyterephthalate. Preferred among the compounds having a structure represented by Formula (1) is diethyl-2,5-dihydroxyterephthalate ("diethyl 2,5-dihydroxyterephthalate", available from Aldrich) because it enables display of even higher contrast images. For example, the compounds having a structure represented by Formula (1) can be easily excited by light having a wavelength of 405 nm.

In Formula (2), $R^2$ represents an organic group, $R^3$ and $R^4$ each represent a hydrogen atom or an organic group, and y is 1, 2, 3, or 4.

The organic group $R^2$ is preferably a hydrocarbon group, more preferably a C1-C10 hydrocarbon group, still more preferably a C1-C5 hydrocarbon group, particularly preferably a C1-C3 hydrocarbon group. When the carbon number of the hydrocarbon group is equal to or smaller than the above upper limit, the luminescent material having a terephthalate structure can be easily dispersed in the interlayer film for laminated glass. The hydrocarbon group is preferably an alkyl group. In Formula (2), $NR^3R^4$ is an amino group. $R_3$ and $R_4$ each are preferably a hydrogen atom. The benzene ring in the compound having a structure represented by the formula (2) may have the amino group(s) at the position(s) of one hydrogen atom, two hydrogen atoms, three hydrogen atoms, or four hydrogen atoms among hydrogen atoms of the benzene ring.

A preferred compound having the structure represented by Formula (2) is diethyl-2,5-diaminoterephthalate (available from Aldrich) because it enables display of even higher contrast images.

The lower limit of the amount of the luminescent material in the luminescent layer is preferably 0.005 parts by weight, the upper limit thereof is preferably 5 parts by weight based on 100 parts by weight of the thermoplastic resin. Sufficient luminescence requires above a certain amount of a luminescent material; however, the use of a large amount of a luminescent material results in low luminescence in some cases. This is attributed to a concentration quenching phenomenon, where interactions between excited luminescent materials cause a transition of absorbed energy into a non-radiative process, which involves no light radiation, leading to reduced luminescence intensity. When the amount of the luminescent material is within the above range, sufficiently high contrast luminescence can be achieved upon irradiation with light having a specific wavelength. The lower limit of the amount of the luminescent material is more preferably 0.01 parts by weight, and the upper limit thereof is more preferably 3 parts by weight. The lower limit is still more preferably 0.05 parts by weight, and the upper limit is still more preferably 1 part by weight.

The lower limit of the amount of the luminescent material in the luminescent layer is preferably 0.005% by weight, the upper limit thereof is preferably 5% by weight in 100% by weight of the luminescent layer. When the amount of the luminescent material is 0.005% by weight or more, the resulting interlayer film for laminated glass can display even higher contrast images. When the amount of the luminescent material is 5% by weight or less, the resulting interlayer film for laminated glass can have even higher transparency. The lower limit of the amount of the luminescent material is more preferably 0.01% by weight, and the upper limit thereof is more preferably 3% by weight. The lower limit is still more preferably 0.02% by weight, and the upper limit is still more preferably 1% by weight.

The luminescent layer preferably further contains a dispersant. With the dispersant, the luminescent material can be finely dispersed in the layer, leading to more uniform luminescence.

The dispersant may be a conventionally known dispersant. Examples thereof include: compounds having a sulfonic acid structure such as linear alkyl benzenesulfonates; compound having an ester structure such as diester compounds, alkyl ricinoleates, phthalates, adipates, sebacates, and phosphates; compounds having an ether structure such as polyoxyethylene glycol, polyoxypropylene glycol, and alkyl phenyl-polyoxyethylene-ethers; compounds having a carboxylic acid structure such as polycarboxylic acids; compound having an amine structure such as laurylamine, dimethyllaurylamine, oleylpropylenediamine, secondary amines of polyoxyethylene, tertiary amines of polyoxyethylene, diamines of polyoxyethylene; compounds having a polyamine structure such as polyalkylenepolyaminealkyleneoxides; compounds having an amide structure such as oleic acid diethanolamides and alkanol fatty acid amides; compounds having a high-molecular-weight amide structure such as polyvinylpyrrolidone and polyester acid amide amine salts; compounds having a silane structure with an alkyl group such as triethoxypropylisocyanatesilane and triethoxybutylsilane; compounds having a silane structure with an acryloxy group such as triethoxypropylacryloxysilane; compounds having a silane structure with a vinyl group such as triethoxypropylvinylsilane; compounds having a polysiloxane structure that are polymers having a side chain such as an epoxy group, a phosphoric acid group, a carboxy group, or a mercapto group; compounds having an isocyanate group such as isocyanates; and compounds having an isocyanurate groups such as isocyanurates. Also usable are high-molecular-weight dispersants such as polyoxyethyl-enealkyletherphosphoric acid (salts), high polymer polycarboxylic acids, and condensed ricinoleates. The "high-molecular-weight dispersant" is defined as a dispersant having a molecular weight of 10000 or more.

When the luminescent layer contains a dispersant, the lower limit of the amount of the dispersant in the luminescent layer is preferably 1 part by weight, and the upper limit thereof is preferably 50 parts by weight based on 100 parts by weight of the luminescent material. When the amount of the dispersant is within this range, the luminescent material can be uniformly dispersed in the luminescent layer. The lower limit of the amount of the dispersant is more preferably 3 parts by weight, and the upper limit thereof is more preferably 30 parts by weight. The lower limit is still more preferably 5 parts by weight, and the upper limit is still more preferably 25 parts by weight.

The luminescent layer may further contain an ultraviolet absorber. With the ultraviolet absorber, the luminescent layer can have high light resistance.

Examples of the ultraviolet absorber include compounds having a malonate structure, compounds having an oxanilide structure, compounds having a benzotriazole structure, compounds having a benzophenone structure, compounds having a triazine structure, compounds having a benzoate structure, and compounds having a hindered amine structure.

When the luminescent layer contains the ultraviolet absorber, the upper limit of the amount of the ultraviolet absorber in the luminescent layer is preferably 1 part by weight, more preferably 0.5 parts by weight, still more preferably 0.2 parts by weight, particularly preferably 0.1 parts by weight based on 100 parts by weight of the polyvinyl acetal resin.

In order to obtain excellent light resistance, the luminescent layer preferably contains an antioxidant.

Any antioxidant may be used. Examples thereof include antioxidants having a phenol structure, antioxidants containing sulfur, and antioxidants containing phosphorus.

The antioxidant having a phenol structure is an antioxidant having a phenol skeleton. Examples of the antioxidant having a phenol structure include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris (3,5-di-t-butyl-4-hydroxybenzyl)benzene, bis(3,3'-t-butylphenol)butyric acid glycol ester, and pentaerythritoltetrakis[3-(3,5-di-tert-butyl-4-hydroxyphenyl)propionate]. The antioxidants may be used alone or in combination of two or more thereof.

The luminescent layer may contain a heat absorbing agent when the interlayer film for laminated glass of the present invention is required to have heat-shielding properties.

The heat absorbing agent may be any heat absorbing agent capable of shielding infrared rays, and preferably is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

The luminescent layer may contain additive(s) such as a light stabilizer or an antistatic agent, if necessary. When a colored band is formed in a part of the interlayer film for laminated glass of the present invention, a part of the luminescent layer may contain a coloring agent such as a blue pigment, a blue dye, a green pigment, or a green dye.

The luminescent layer preferably has a magnesium element concentration of 80 ppm or less. In the case that the luminescent material has a terephthalate structure, the luminescent material having a terephthalate structure and a magnesium element form a complex, which particularly tends to cause discoloration of the interlayer film for laminated glass. When the luminescent layer has a magnesium element concentration of 80 ppm or less, the discoloration of the interlayer film for laminated glass can be suppressed. For further suppression of the discoloration of the interlayer film for laminated glass, the magnesium element concentration of the luminescent layer is preferably 75 ppm or less, more preferably 60 ppm or less, still more preferably 50 ppm or less, particularly preferably 40 ppm or less, most preferably 30 ppm or less, still most preferably 25 ppm or less. The magnesium element concentration of the luminescent layer may be 0 ppm.

The magnesium element may be contained in the luminescent layer in the form of metallic magnesium or a magnesium salt, for example.

The "discoloration" means that the YI value of a laminated glass including the interlayer film for laminated glass between two clear glass sheets (thickness: 2.5 mm) exceeds 20. The YI value can be measured using a spectrophotometer ("U-4100", available from Hitachi High-Technologies Corporation) in accordance with JIS Z 8722. The YI value is preferably 20 or less, more preferably 15 or less, still more preferably 10 or less, and is preferably 0 or more.

The luminescent layer preferably has a lithium element concentration of 25 ppm or less. When the luminescent layer contains a large amount of a lithium element, the interlayer film for laminated glass is considered to discolor due to the formation of a complex of the luminescent material having a terephthalate structure with the lithium element. When the luminescent layer has a lithium element concentration of 25 ppm or less, the discoloration of the interlayer film for laminated glass can be further suppressed. The upper limit of the lithium element concentration of the luminescent layer is more preferably 20 ppm, still more preferably 10 ppm or less, and the lower limit thereof is preferably 0 ppm, more preferably 1 ppm.

The shape-adjusting layer contains a thermoplastic resin and a plasticizer. The thermoplastic resin and the plasticizer contained in the shape-adjusting layer may be the same as those contained in the luminescent layer. In order to display even higher contrast images at a luminance within a certain range, the shape-adjusting layer preferably contains no luminescent material or has a lower luminance material concentration (% by weight) than the luminescent layer. The thermoplastic resin in the shape-adjusting layer is preferably a polyvinyl acetal resin.

The shape-adjusting layer preferably further contains an adhesion modifier.

The adhesion modifier is not limited, and is preferably a metal salt. The adhesion modifier is preferably at least one metal salt selected from the group consisting of an alkali metal salt, an alkaline earth metal salt, and a magnesium salt. The metal salt preferably contains at least one metal selected from potassium and magnesium. The metal salt is more preferably an alkali metal salt of a C1-C16 organic acid, an alkaline earth metal salt of a C1-C16 organic acid, or a magnesium salt of a C1-C16 organic acid, still more preferably an alkali metal salt of a C2-C16 organic acid, an alkaline earth metal salt of a C2-C16 organic acid, or a magnesium salt of a C2-C16 organic acid, particularly preferably a magnesium salt of a C2-C16 carboxylic acid or a potassium salt of a C2-C16 carboxylic acid. The magnesium salt of a C2-C16 carboxylic acid and the potassium salt of a C2-C16 carboxylic acid are not limited. Examples thereof include magnesium acetate, potassium acetate, magnesium propionate, potassium propionate, magnesium 2-ethylbutanoate, potassium 2-ethylbutanoate, magnesium 2-ethylhexanoate, and potassium 2-ethylhexanoate. The lower limit of the carbon number of the organic acid is preferably 1, and the upper limit thereof is preferably 10. The lower limit is more preferably 2, and the upper limit is more preferably 8.

The amount of the adhesion modifier in the shape-adjusting layer is not limited. The lower limit thereof is preferably 0.0005 parts by weight, and the upper limit thereof is preferably 0.05 parts by weight based on 100 parts by weight of the thermoplastic resin. When the amount of the adhesion modifier is 0.0005 parts by weight or more, the laminated glass has high penetration resistance. When the amount of the adhesion modifier is 0.05 parts by weight or less, the interlayer film for laminated glass has high transparency. The lower limit of the amount of the adhesion modifier is more preferably 0.002 parts by weight, and the upper limit is more preferably 0.02 parts by weight.

For high moisture resistance of the shape-adjusting layer, the total amount of the alkali metal, the alkaline earth metal, and the magnesium in the shape-adjusting layer is preferably 300 ppm or less. For example, the alkali metal, the alkaline earth metal, and the magnesium may be contained as metals derived from the adhesion modifier, or may be contained as metals derived from a neutralizing agent used during the synthesis of the polyvinyl acetal resin. The total amount of the alkali metal, the alkaline earth metal, and the magnesium in the shape-adjusting layer is more preferably 200 ppm or less, still more preferably 150 ppm or less, particularly preferably 100 ppm or less. In order to further prevent the discoloration of the interlayer film for laminated glass, the shape-adjusting layer preferably has a magnesium element concentration of 150 ppm or less, more preferably 100 ppm or less, still more preferably 50 ppm or less, particularly preferably 30 ppm or less. The magnesium element concentration of the shape-adjusting layer may be 0 ppm or more than 0 ppm.

The shape-adjusting layer may further contain additive(s) such as an ultraviolet absorber, an antioxidant, a heat absorbing agent, a light stabilizer, or an antistatic agent, if necessary.

When a colored band is formed in a part of the interlayer film for laminated glass of the present invention, a part of the shape-adjusting layer may contain a coloring agent such as blue pigment, a blue dye, a green pigment, or a green dye.

When the luminescent layer and the shape-adjusting layer in the interlayer film for laminated glass of the present invention both contain a polyvinyl acetal resin as the thermoplastic resin, the combination of the polyvinyl acetal resins for these layers are preferably selected such that the polyvinyl acetal resin in the luminescent layer has a lower hydroxy group content than the polyvinyl acetal resin in the shape-adjusting layer. Such a combination prevents migration of the luminescent material from the luminescent layer to the shape-adjusting layer.

In order to further prevent the migration of the luminescent material from the luminescent layer to the shape-adjusting layer, the polyvinyl acetal resin in the luminescent layer and the polyvinyl acetal resin in the shape-adjusting layer preferably have a difference in the hydroxy group content of less than 6.5 mol %. The difference in the hydroxy group content is more preferably 6.4 mol % or less, still more preferably 6.2 mol % or less, particularly preferably 6.0 mol % or less, most preferably 5.8 mol % or less.

The difference in the hydroxy group content is preferably 1 mol % or more, more preferably 2 mol % or more, still more preferably 3 mol % or more.

Various properties can be given to the resulting interlayer film for laminated glass by selecting the combinations of the thermoplastic resins and the plasticizers in the luminescent layer and the shape-adjusting layer.

For example, when the luminescent layer has a higher plasticizer content than the shape-adjusting layer, sound insulation properties can be given to the interlayer film for laminated glass of the present invention. Specifically, a difference in the plasticizer content of preferably 5 parts by weight or more, more preferably 10 parts by weight or more, still more preferably 15 parts by weight or more can lead to high sound insulation properties. The difference in the plasticizer content is preferably 50 parts by weight or less, more preferably 40 parts by weight or less, still more preferably 35 parts by weight or less.

In order to further enhance the sound insulation properties, the polyvinyl acetal resin in the luminescent layer preferably has a higher degree of acetylation than the polyvinyl acetal resin in the shape-adjusting layer. Specifically, the difference in the degree of acetylation between the polyvinyl acetal resins is preferably 0.1 mol % or more, more preferably 1 mol % or more, still more preferably 5 mol % or more, particularly preferably 10 mol % or more.

In order to further enhance the sound insulation properties, the polyvinyl acetal resin in the luminescent layer preferably has a lower hydroxy group content than the polyvinyl acetal resin in the shape-adjusting layer. Specifically, the difference in the hydroxy group content is preferably 1 mol % or more, more preferably 3 mol % or more, still more preferably 5 mol % or more.

In order to further enhance the sound insulation properties, the polyvinyl acetal resin in the luminescent layer preferably has a higher degree of acetalization than the polyvinyl acetal resin in the shape-adjusting layer.

The interlayer film for laminated glass of the present invention may be produced by any method. For example, a plasticizer solution containing a plasticizer and a luminescent material is sufficiently mixed with a polyvinyl acetal resin to prepare a resin composition for the luminescent layer. Subsequently, a plasticizer solution containing an adhesion modifier and a plasticizer is sufficiently mixed with a polyvinyl acetal resin to prepare a resin composition for the shape-adjusting layer. Then, the resin composition for the luminescent layer and the resin composition for the shape-adjusting layer are co-extruded with a co-extruder, whereby an interlayer film for laminated glass including the luminescent layer and the shape-adjusting layer laminated together can be obtained.

The interlayer film for laminated glass of the present invention includes the luminescent layer, and thus becomes luminous under irradiation with light having a specific wavelength. Such a property allows display of information at high contrast.

Examples of the device for irradiation with light having a specific wavelength include a spot light source (LC-8, available from Hamamatsu Photonics K.K.), a xenon flash lamp (CW lamp, available from Heraeus Holding), and a black light (Carry Hand, available from Iuchi Seieido Co., Ltd.).

The present invention also encompasses a laminated glass including a pair of glass sheets and the laminated glass of the present invention between the glass sheets.

The glass sheets may be commonly used transparent plate glass. Examples thereof include inorganic glass such as float plate glass, polished plate glass, molded plate glass, wired glass, colored plate glass, heat-absorbing glass, heat-reflecting glass, and green glass. Also usable is UV light-shielding glass including a UV light-shielding coating on the surface of glass; however, such glass is preferably used as a glass sheet on a side opposite the side to be irradiated with light having a specific wavelength. Also usable are organic plastic sheets such as polyethylene terephthalate, polycarbonate, or polyacrylate sheets.

As the glass sheets, two or more kinds of glass sheets may be used. Exemplary cases thereof include a laminated glass in which the interlayer film for laminated glass of the present invention is sandwiched between a transparent float plate glass and a colored glass sheet such as green glass. Moreover, as the glass sheets, two or more kinds of glass sheets different in the thickness may be used.

Advantageous Effects of Invention

The present invention provides an interlayer film for laminated glass which prevents a double image phenomenon in a specific area of a laminated glass and enables display of high contrast images at a luminance within a certain range. The present invention also provides a laminated glass including the interlayer film for laminated glass.

DESCRIPTION OF EMBODIMENTS

Embodiments of the present invention will be further described below with reference to examples. The present invention is not limited to the examples.

Example 1

(1) Preparation of Resin Composition for Luminescent Layer

To 60 parts by weight of triethylene glycol di-2-ethylhexanoate (3GO) was added 1.5 parts by weight of diethyl-2,5-dihydroxyterephthalate ("diethyl 2,5-dihydroxyterephthalate", available from Aldrich), which was a compound represented by Formula (1), as a luminescent material. Thus, a luminescent plasticizer solution was prepared. Separately, polyvinyl butyral (acetyl group content: 12.5 mol %, hydroxy group content: 23.6 mol %, degree of butyralization: 63.9 mol %) was obtained by acetalizing polyvinyl alcohol having a degree of polymerization of 2300 with n-butyraldehyde. All of the obtained plasticizer solution and 100 parts by weight of the polyvinyl butyral were sufficiently kneaded with a mixing roll to prepare a resin composition for a luminescent layer.

(2) Preparation of Resin Composition for Shape-Adjusting Layer

Magnesium acetate as an adhesion modifier was added to 40 parts by weight of triethylene glycol di-2-ethylhexanoate (3GO), whereby a plasticizer solution was prepared. Separately, polyvinyl butyral (acetyl group content: 0.9 mol %, hydroxy group content: 30.0 mol %, degree of butyralization: 69.1 mol %) was prepared by acetalizing polyvinyl alcohol having a degree of polymerization of 1700 with n-butyraldehyde. All of the obtained plasticizer solution and 100 parts by weight of the polyvinyl butyral were sufficiently kneaded with a mixing roll to prepare a resin composition for a shape-adjusting layer.

The magnesium acetate was added to the triethylene glycol di-2-ethylhexanoate (3GO) in such an amount that the shape-adjusting layer had a magnesium element concentration of 70 ppm.

(3) Preparation of Interlayer Film for Laminated Glass

Figure 1:
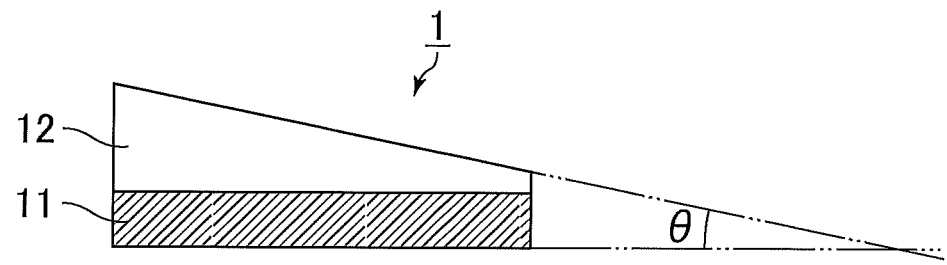
FIG. 1 is a schematic view illustrating an exemplary embodiment of the interlayer film for laminated glass of the present invention.
Figure 2:
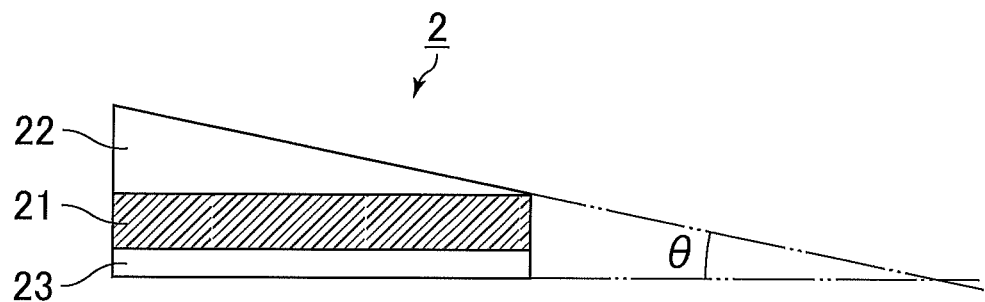
FIG. 2 is a schematic view illustrating an exemplary embodiment of the interlayer film for laminated glass of the present invention.
Figure 3:
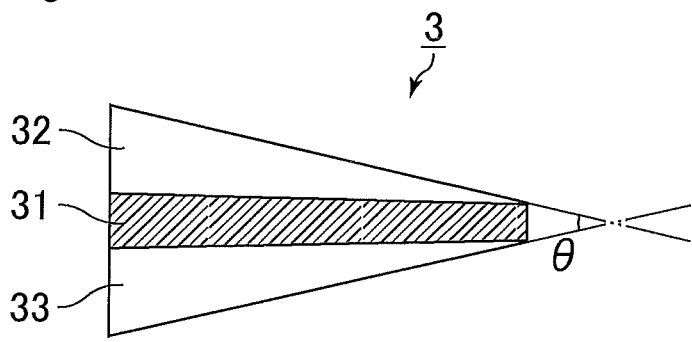
FIG. 3 is a schematic view illustrating an exemplary embodiment of the interlayer film for laminated glass of the present invention.

The resin composition for a luminescent layer and resin composition for a shape-adjusting layer obtained above were co-extruded with extruders to prepare a three-layer interlayer film for laminated glass as shown in FIG. 3, in which a shape-adjusting layer, a luminescent layer, and another shape-adjusting layer were laminated in the stated order.

The shortest distance between a first end and a second end in the direction perpendicular to the extrusion direction of the obtained interlayer film was 1 m.

The luminescent layer of the obtained interlayer film for laminated glass had a wedge-shaped cross-sectional shape with a minimum thickness of 90 μm and a maximum thickness of 140 μm. The entire interlayer film for laminated glass had a wedge-shaped cross-sectional shape with a minimum thickness of 800 μm and a maximum thickness of 1200 μm. The first end of the interlayer film for laminated glass had the minimum thickness and the second end had the maximum thickness. The minimum and maximum thicknesses were measured by observation with a light microscope.

(4) Preparation of Laminated Glass

The obtained interlayer film was interposed between two transparent float glass sheets (1000 mm long×300 mm wide×2.5 mm thick) to prepare a laminate. The laminate was temporarily pressure-bonded with heating rolls at 230° C. The temporarily pressure-bonded laminate was pressure-bonded using an autoclave by a heating roll method at 135° C. and 1.2 MPa for 20 minutes to prepare a laminated glass (1000 mm long×300 mm wide).

(5) Preparation of Laminated Glass for Luminance Measurement

A piece (thin portion) having a size of 10 cm long×10 cm wide was cut out of the interlayer film such that the center of the piece was at a point on the shortest line between the first and second ends and 10 cm away from the first end. Similarly, a piece (thick portion) having a size of 10 cm long×10 cm wide was cut out of the interlayer film such that the center of the piece was at a point on the shortest line between the first and second ends and 10 cm away from the second end.

Each of the pieces (the thin portion and the thick portion) of the interlayer film was interposed between two transparent float glass sheets (100 mm long×100 mm wide×2.5 mm thick) to prepare a laminate. The laminate was temporarily pressure-bonded with heating rolls at 230° C. The temporarily pressure-bonded laminate was then pressure-bonded by a heating roll method with an autoclave at 135° C. and 1.2 MPa for 20 minutes to prepare a laminated glass (100 mm long×100 mm wide) for luminance measurement.

Examples 2 and 3

An interlayer film for laminated glass and laminated glasses were obtained in the same manner as in Example 1, except that the kind of the luminescent material and the maximum and minimum thicknesses in the thickness direction of the luminescent layer were changed as shown in Table 1.

Comparative Examples 1 and 2

An interlayer film for laminated glass and laminated glasses were obtained in the same manner as in Example 1, except that the kind of the luminescent material and the maximum and minimum thicknesses in the thickness direction of the luminescent layer were changed as shown in Table 1, and that the shape-adjusting layer was not laminated.

Examples 4 to 8, Comparative Examples 3 and 4

An interlayer film for laminated glass and laminated glasses were obtained in the same manner as in Example 1, except that the maximum and minimum thicknesses in the thickness direction of the luminescent layer and the minimum and maximum thicknesses and the wedge angle of the interlayer film were changed as shown in Table 2.

Examples 9 to 12, Comparative Examples 5 and 6

An interlayer film for laminated glass and laminated glasses were obtained in the same manner as in Example 1, except that the composition of the polyvinyl butyral, the plasticizer content, the maximum and minimum thicknesses in the thickness direction of the luminescent layer, and the minimum and maximum thicknesses and the wedge angle of the interlayer film were changed as shown in Table 3.

Example 13

(1) Preparation of Resin Composition for Luminescent Layer

To 40 parts by weight of triethylene glycol di-2-ethylhexanoate (3GO) was added 1.5 parts by weight of diethyl-2,5-dihydroxyterephthalate ("diethyl 2,5-dihydroxyterephthalate", available from Aldrich), which was a compound represented by Formula (1), as a luminescent material. Thus, a luminescent plasticizer solution was prepared. Separately, polyvinyl butyral (acetyl group content: 0.9 mol %, hydroxy group content: 30.0 mol %, degree of butyralization: 69.1 mol %) was obtained by acetalizing polyvinyl alcohol having a degree of polymerization of 1700 with n-butyraldehyde. All of the obtained plasticizer solution and 100 parts by weight of polyvinyl butyral were sufficiently kneaded with a mixing roll to prepare a resin composition for a luminescent layer.

(2) Preparation of Resin Composition for First and Second Resin Layers

Magnesium acetate as an adhesion modifier was added to 40 parts by weight of triethylene glycol di-2-ethylhexanoate (3GO), whereby a plasticizer solution was prepared. Separately, polyvinyl butyral (acetyl group content: 0.9 mol %, hydroxy group content: 30.0 mol %, degree of butyralization: 69.1 mol %) was prepared by acetalizing polyvinyl alcohol having a degree of polymerization of 1700 with n-butyraldehyde. All of the obtained plasticizer solution and 100 parts by weight of the polyvinyl butyral were sufficiently kneaded with a mixing roll to prepare a resin composition for first and second resin layers.

The magnesium acetate was added to the triethyleneglycol di-2-ethylhexanoate (3GO) in such an amount that the first and second resin layers had a magnesium element concentration of 70 ppm.

(3) Preparation of Resin Composition for Sound Insulation Layer

Polyvinyl butyral (acetyl group content: 12.5 mol %, hydroxy group content: 23.6 mol %, degree of butyralization: 63.9 mol %) was obtained by acetalizing polyvinyl alcohol having a degree of polymerization of 2300 with n-butyraldehyde. An amount of 60 parts by weight of triethylene glycol di-2-ethylhexanoate (3GO) and 100 parts by weight of the polyvinyl butyral were sufficiently kneaded with a mixing roll to prepare a resin composition for a sound insulation layer.

(4) Preparation of Shape-Adjusting Layer

The resin composition for first and second resin layers and the resin composition for a sound insulation layer were co-extruded with a co-extruder, whereby a three-layer laminate as a shape-adjusting layer was prepared in which a first resin layer, a sound insulation layer, and a second resin layer were laminated in the stated order.

(5) Preparation of Interlayer Film for Laminated Glass

The obtained resin composition for a luminescent layer was extruded into a single layer to prepare a luminescent layer. The shape-adjusting layer and the luminescent layer were laminated such that the first resin layer, the sound insulation layer, the second resin layer, and the luminescent layer were laminated in the stated order. Thus, a four-layer interlayer film for laminated glass was obtained.

The shortest distance between a first end and a second end in the direction perpendicular to the extrusion direction of the obtained film was 1 m.

The luminescent layer of the obtained interlayer film for laminated glass had a wedge-shaped cross-sectional shape with a minimum thickness of 90 μm and a maximum thickness of 140 μm. The entire interlayer film for laminated glass had a wedge-shaped cross-sectional shape with a minimum thickness of 800 μm and a maximum thickness of 1200 μm. The first resin layer of the obtained interlayer film for laminated glass had a wedge-shaped cross-sectional shape with a minimum thickness of 305 μm and a maximum thickness of 480 μm. The sound insulation layer had a rectangular cross-sectional shape with an average thickness of 100 μm. The second resin layer had a wedge-shaped cross-sectional shape with a minimum thickness of 305 μm and a maximum thickness of 480 μm. The first end of the interlayer film for laminated glass had the minimum thickness and the second end had the maximum thickness. The minimum and maximum thicknesses were measured by observation with a light microscope.

(6) Preparation of Laminated Glass

The obtained interlayer film was interposed between two transparent float glass sheets (1000 mm long×300 mm wide×2.5 mm thick) to prepare a laminate. The laminate was temporarily pressure-bonded with heating rolls at 230° C. The temporarily pressure-bonded laminate was pressure-bonded by a heating roll method with an autoclave at 135° C. and 1.2 MPa for 20 minutes to prepare a laminated glass (1000 mm long×300 mm wide).

(7) Preparation of Laminated Glass for Luminance Measurement

A piece (thin portion) having a size of 10 cm long×10 cm wide was cut out of the interlayer film such that the center of the piece was at a point on the shortest line between the first and second ends and 10 cm away from the first end. Similarly, a piece (thick portion) having a size of 10 cm long×10 cm wide was cut out of the interlayer film such that the center of the piece was at a point on the shortest line between the first and second ends and 10 cm away from the second end.

Each of the pieces (the thin portion and the thick portion) of the interlayer film was interposed between two transparent float glass sheets (100 mm long×100 mm wide×2.5 mm thick) to prepare a laminate. The laminate was temporarily pressure-bonded with heating rolls at 230° C. The temporarily pressure-bonded laminate was then pressure-bonded by a heating roll method with an autoclave at 135° C. and 1.2 MPa for 20 minutes to prepare a laminated glass (100 mm long×100 mm wide) for luminance measurement.

Example 14, Comparative Examples 7 and 8

An interlayer film for laminated glass and laminated glasses were obtained in the same manner as in Example 13, except that the minimum and maximum thicknesses of the luminescent layer, the minimum and maximum thicknesses of the first resin layer, and the minimum and maximum thicknesses of the second resin layer were changed as shown in Table 4.

(Evaluation)

The laminated glasses obtained in the examples and the comparative examples were evaluated in the following methods.

The results are shown in Tables 1 to 4.

(1) Evaluation of Occurrence of Double Image Phenomenon

Each obtained laminated glass (1000 mm long×300 mm wide) was mounted at the position of a windshield. Information was reflected on the laminated glass from a display unit disposed below the laminated glass. The occurrence or nonoccurrence of a double image phenomenon was visually checked from a predetermined position. A laminated glass on which no double image phenomenon was observed was rated "○ (Good)", and a laminated film on which a double image phenomenon was observed was rated "x (Poor)".

(2) Evaluation of Luminance Variation

Each laminated glass for luminance measurement was placed in a dark room, and the entire surface thereof was irradiated with light from a high power xenon light source ("REX-250", Asahi Spectra Co., Ltd, irradiation wavelength: 405 nm) set at a position of 10 cm distant from the plane of the laminated glass in the vertical direction. The luminance was measured with a luminance meter ("SR-3AR", available from Topcon Technohouse Corporation) set at a position at an angle of 45 degrees relative to the plane of the irradiated laminated glass at a distance (shortest distance) of 35 cm from the plane of the laminated glass.

A rating "○ (Good)" was given when the absolute value of the difference in the luminance between the thin portion and the thick portion of the interlayer film was 200 or less. A rating "x (Poor)" was given when the absolute value of the difference was more than 200.

TABLE 1

| | | | Example 1 | Example 2 | Example 3 | Comparative Example 1 | Comparative Example 2 |
|---|---|---|---|---|---|---|---|
| Composition | Resin composition for luminescent layer (parts by weight) | Polyvinyl butyral (Hydroxy group content: 23.6 mol %, Acetyl group content: 12.5 mol %, Degree of acetalization: 63.9 mol %) | 100 | 100 | 100 | 100 | 100 |
| | | Plasticizer (3GO) | 60 | 60 | 60 | 40 | 40 |
| | | Luminescent material (diethyl-2,5-dihydroxyterephthalate) | 1.5 | 1.5 | 0 | 0.2 | 0 |
| | | Luminescent material (2-(3-oxoindolin-1-ylidene)methylquinoline) | 0 | 0 | 1.5 | 0 | 0.2 |
| | Resin composition for shape-adjusting layer (parts by weight) | Polyvinyl butyral (Hydroxy group content: 30.0 mol %, Acetyl group content: 0.9 mol %, Degree of acetalization: 69.1 mol %) | 100 | 100 | 100 | — | — |
| | | Plasticizer (3GO) | 40 | 40 | 40 | — | — |
| | | Luminescent material (diethyl-2,5-dihydroxyterephthalate) | 0 | 0 | 0 | — | — |
| | | Luminescent material (2-(3-oxoindolin-1-ylidene)methylquinoline) | 0 | 0 | 0 | — | — |
| Shape | Luminescent layer | Minimum thickness (μm) | 90 | 300 | 90 | 800 | 800 |
| | | Maximum thickness (μm) | 140 | 350 | 140 | 1200 | 1200 |
| | | Shape | Wedge shape | Wedge shape | Wedge shape | Wedge shape | Wedge shape |
| | Interlayer film | Minimum thickness (μm) | 800 | 800 | 800 | 800 | 800 |
| | | Maximum thickness (μm) | 1200 | 1200 | 1200 | 1200 | 1200 |
| | | Wedge angle θ (mrad) | 0.4 | 0.4 | 0.4 | 0.4 | 0.4 |
| Evaluation | Evaluation of occurance of double image phenomenon | | ○ | ○ | ○ | ○ | ○ |
| | Evaluation of luminance variation | Luminance of thin portion | 726 | 780 | 1200 | 715 | 1110 |
| | | Luminance of thick portion | 754 | 790 | 1210 | 975 | 1510 |
| | | Luminance variation | ○ | ○ | ○ | x | x |

TABLE 2

|  |  |  | Example 4 | Example 5 | Example 6 | Example 7 |
|---|---|---|---|---|---|---|
| Composition | Resin composition for luminescent layer (parts by weight) | Polyvinyl butyral (Hydroxy group content 23.6 mol %, Acetyl group content 12.5 mol %, Degree of acetalization: 63.9 mol %) | 100 | 100 | 100 | 100 |
|  |  | Plasticizer (3GO) | 60 | 60 | 60 | 60 |
|  |  | Luminescent material (diethyl-2,5-dihydroxyterephthalate) | 1.5 | 1.5 | 1.5 | 1.5 |
|  |  | Luminescent material (2-(3-oxoindolin-1-ylidene)methylquinoline) | 0 | 0 | 0 | 0 |
|  | Resin composition for shape-adjusting layer (parts by weight) | Polyvinyl butyral (Hydroxy group content 30.0 mol %, Acetyl group content 0.9 mol %, Degree of acetalization: 69.1 mol %) | 100 | 100 | 100 | 100 |
|  |  | Plasticizer (3GO) | 40 | 40 | 40 | 40 |
|  |  | Luminescent material (diethyl-2,5-dihydroxyterephthalate) | 0 | 0 | 0 | 0 |
|  |  | Luminescent material (2-(3-oxoindolin-1-ylidene)methylquinoline) | 0 | 0 | 0 | 0 |
| Shape | Luminescent layer | Minimum thickness (μm) | 90 | 300 | 100 | 320 |
|  |  | Maximum thickness (μm) | 180 | 350 | 200 | 380 |
|  |  | Shape | Wedge shape | Wedge shape | Wedge shape | Wedge shape |
|  | Interlayer film | Minimum thickness (μm) | 800 | 800 | 800 | 800 |
|  |  | Maximum thickness (μm) | 1500 | 1500 | 1800 | 1800 |
|  |  | Wedge angle θ (mrad) | 0.7 | 0.7 | 1 | 1 |
| Evaluation | Evaluation of occurance of double image phenomenon |  | ○ | ○ | ○ | ○ |
|  | Evaluation of luminance variation | Luminance of thin portion | 726 | 780 | 734 | 783 |
|  |  | Luminance of thick portion | 772 | 790 | 776 | 795 |
|  |  | Evaluation of luminance variation | ○ | ○ | ○ | ○ |

|  |  |  | Example 8 | Comparative Example 3 | Comparative Example 4 |
|---|---|---|---|---|---|
| Composition | Resin composition for luminescent layer (parts by weight) | Polyvinyl butyral (Hydroxy group content 23.6 mol %, Acetyl group content 12.5 mol %, Degree of acetalization: 63.9 mol %) | 100 | 100 | 100 |
|  |  | Plasticizer (3GO) | 60 | 60 | 60 |
|  |  | Luminescent material (diethyl-2,5-dihydroxyterephthalate) | 1.5 | 1.5 | 1.5 |
|  |  | Luminescent material (2-(3-oxoindolin-1-ylidene)methylquinoline) | 0 | 0 | 0 |
|  | Resin composition for shape-adjusting layer (parts by weight) | Polyvinyl butyral (Hydroxy group content 30.0 mol %, Acetyl group content 0.9 mol %, Degree of acetalization: 69.1 mol %) | 100 | 100 | 100 |
|  |  | Plasticizer (3GO) | 40 | 40 | 40 |
|  |  | Luminescent material (diethyl-2,5-dihydroxyterephthalate) | 0 | 0 | 0 |
|  |  | Luminescent material (2-(3-oxoindolin-1-ylidene)methylquinoline) | 0 | 0 | 0 |
| Shape | Luminescent layer | Minimum thickness (μm) | 90 | 100 | 300 |
|  |  | Maximum thickness (μm) | 190 | 300 | 500 |
|  |  | Shape | Wedge shape | Wedge shape | Wedge shape |
|  | Interlayer film | Minimum thickness (μm) | 800 | 800 | 800 |
|  |  | Maximum thickness (μm) | 1200 | 1200 | 1200 |
|  |  | Wedge angle θ (mrad) | 0.4 | 0.4 | 0.4 |
| Evaluation | Evaluation of occurance of double image phenomenon |  | ○ | ○ | ○ |
|  | Evaluation of luminance variation | Luminance of thin portion | 725 | 730 | 780 |
|  |  | Luminance of thick portion | 805 | 935 | 1000 |
|  |  | Evaluation of luminance variation | ○ | x | x |

TABLE 3

|  |  |  |  |  | Example 9 | Example 10 | Example 11 |
|---|---|---|---|---|---|---|---|
| Composition | Resin composition for luminescent layer | Polyvinyl butyral | Hydroxy group content (mol %) | | 24.5 | 24.5 | 18 |
|  |  |  | Acetyl group content (mol %) | | 7.5 | 7.5 | 1 |
|  |  |  | Degree of acetalization (mol %) | | 68 | 68 | 81 |
|  |  |  | Parts by weight | | 100 | 100 | 100 |
|  |  | Plasticizer (3GO) (parts by weight) | | | 60 | 60 | 60 |
|  |  | Luminescent material (diethyl-2,5-dihydroxyterephthalate) (parts by weight) | | | 1.5 | 1.5 | 1.5 |
|  |  | Luminescent material (2-(3-oxoindolin-1-ylidene)methylquinoline) (parts by weight) | | | 0 | 0 | 0 |
|  | Resin composition for shape-adjusting layer | Polyvinyl butyral | Hydroxy group content (mol %) | | 31 | 31 | 29 |
|  |  |  | Acetyl group content (mol %) | | 1 | 1 | 1 |
|  |  |  | Degree of acetalization (mol %) | | 68 | 68 | 70 |
|  |  |  | Parts by weight | | 100 | 100 | 100 |
|  |  | Plasticizer (3GO) (parts by weight) | | | 40 | 40 | 40 |
|  |  | Luminescent material (diethyl-2,5-dihydroxyterephthalate) (parts by weight) | | | 0 | 0 | 0 |
|  |  | Luminescent material (2-(3-oxoindolin-1-ylidene)methylquinoline) (parts by weight) | | | 0 | 0 | 0 |
| Shape | Luminescent layer | Minimum thickness (μm) | | | 90 | 100 | 90 |
|  |  | Maximum thickness (μm) | | | 140 | 200 | 140 |
|  |  | Shape | | | Wedge shape | Wedge shape | Wedge shape |
|  | Interlayer film | Minimum thickness (μm) | | | 800 | 800 | 800 |
|  |  | Maximum thickness (μm) | | | 1200 | 1800 | 1200 |
|  |  | Wedge angle θ (mrad) | | | 0.4 | 1 | 0.4 |
| Evaluation | Evaluation of occurance of double image phenomenon | | | | ○ | ○ | ○ |
|  | Evaluation of luminance variation | Luminance of thin portion | | | 726 | 733 | 725 |
|  |  | Luminance of thick portion | | | 754 | 771 | 754 |
|  |  | Evaluation of luminance variation | | | ○ | ○ | ○ |

|  |  |  |  |  | Example 12 | Comparative Example 5 | Comparative Example 6 |
|---|---|---|---|---|---|---|---|
| Composition | Resin composition for luminescent layer | Polyvinyl butyral | Hydroxy group content (mol %) | | 18 | 24.5 | 18 |
|  |  |  | Acetyl group content (mol %) | | 1 | 7.5 | 1 |
|  |  |  | Degree of acetalization (mol %) | | 81 | 68 | 81 |
|  |  |  | Parts by weight | | 100 | 100 | 100 |
|  |  | Plasticizer (3GO) (parts by weight) | | | 60 | 60 | 60 |
|  |  | Luminescent material (diethyl-2,5-dihydroxyterephthalate) (parts by weight) | | | 1.5 | 1.5 | 1.5 |
|  |  | Luminescent material (2-(3-oxoindolin-1-ylidene)methylquinoline) (parts by weight) | | | 0 | 0 | 0 |
|  | Resin composition for shape-adjusting layer | Polyvinyl butyral | Hydroxy group content (mol %) | | 29 | 31 | 29 |
|  |  |  | Acetyl group content (mol %) | | 1 | 1 | 1 |
|  |  |  | Degree of acetalization (mol %) | | 70 | 68 | 70 |
|  |  |  | Parts by weight | | 100 | 100 | 100 |
|  |  | Plasticizer (3GO) (parts by weight) | | | 40 | 40 | 40 |
|  |  | Luminescent material (diethyl-2,5-dihydroxyterephthalate) (parts by weight) | | | 0 | 0 | 0 |
|  |  | Luminescent material (2-(3-oxoindolin-1-ylidene)methylquinoline) (parts by weight) | | | 0 | 0 | 0 |

TABLE 3-continued

| | | | | | |
|---|---|---|---|---|---|
| Shape | Luminescent layer | Minimum thickness (μm) | 100 | 100 | 100 |
| | | Maximum thickness (μm) | 200 | 300 | 300 |
| | | Shape | Wedge shape | Wedge shape | Wedge shape |
| | Interlayer film | Minimum thickness (μm) | 800 | 800 | 800 |
| | | Maximum thickness (μm) | 1800 | 1200 | 1200 |
| | | Wedge angle θ (mrad) | 1 | 0.4 | 0.4 |
| Evaluation | Evaluation of occurance of double image phenomenon | | ○ | ○ | ○ |
| | Evaluation of luminance variation | Luminance of thin portion | 730 | 730 | 730 |
| | | Luminance of thick portion | 769 | 935 | 935 |
| | | Evaluation of luminance variation | ○ | x | x |

TABLE 4

| | | | Example 13 | Example 14 | Comparative Example 7 | Comparative Example 8 |
|---|---|---|---|---|---|---|
| Composition | Shape-adjusting layer | Resin composition for first resin layer (parts by weight) | | | | |
| | | Polyvinyl butyral (Hydroxy group content: 30.0 mol %, Acetyl group content: 0.9 mol %, Degree of acetalization: 69.1 mol %) | 100 | 100 | 100 | 100 |
| | | Plasticizer (3GO) | 40 | 40 | 40 | 40 |
| | | Luminescent material (diethyl-2,5-dihydroxyterephthalate) | 0 | 0 | 0 | 0 |
| | | Luminescent material (2-(3-oxoindolin-1-ylidene)methylquinoline) | 0 | 0 | 0 | 0 |
| | Resin composition for sound insulation layer (parts by weight) | Polyvinyl butyral (Hydroxy group content: 23.6 mol %, Acetyl group content: 12.5 mol %, Degree of acetalization: 63.9 mol %) | 100 | 100 | 100 | 100 |
| | | Plasticizer (3GO) | 60 | 60 | 60 | 60 |
| | | Luminescent material (diethyl-2,5-dihydroxyterephthalate) | 0 | 0 | 0 | 0 |
| | | Luminescent material (2-(3-oxoindolin-1-ylidene)methylquinoline) | 0 | 0 | 0 | 0 |
| | Resin composition for second resin layer (parts by weight) | Polyvinyl butyral (Hydroxy group content: 30.0 mol %, Acetyl group content: 0.9 mol %, Degree of acetalization: 69.1 mol %) | 100 | 100 | 100 | 100 |
| | | Plasticizer (3GO) | 40 | 40 | 40 | 40 |
| | | Luminescent material (diethyl-2,5-dihydroxyterephthalate) | 0 | 0 | 0 | 0 |
| | | Luminescent material (2-(3-oxoindolin-1-ylidene)methylquinoline) | 0 | 0 | 0 | 0 |
| | Resin composition for luminescent layer (parts by weight) | Polyvinyl butyral (Hydroxy group content: 30.0 mol %, Acetyl group content: 0.9 mol %, Degree of acetalization: 69.1 mol %) | 100 | 100 | 100 | 100 |
| | | Plasticizer (3GO) | 40 | 40 | 40 | 40 |
| | | Luminescent material (diethyl-2,5-dihydroxyterephthalate) | 1.5 | 1.5 | 1.5 | 1.5 |
| | | Luminescent material (2-(3-oxoindolin-1-ylidene)methylquinoline) | 0 | 0 | 0 | 0 |
| Shape | Interlayer film configuration | | First resin layer/ Sound insulation layer/ Second resin layer/ Luminescent layer | First resin layer/ Sound insulation layer/ Second resin layer/ Luminescent layer | First resin layer/ Sound insulation layer/ Second resin layer/ Luminescent layer | First resin layer/ Sound insulation layer/ Second resin layer/ Luminescent layer |
| | First resin layer | Minimum thickness (μm) | 305 | 200 | 300 | 200 |
| | | Maximum thickness (μm) | 480 | 375 | 400 | 300 |
| | | Average thickness (μm) | 100 | 100 | 100 | 100 |
| | Sound insulation layer | Minimum thickness (μm) | 305 | 200 | 300 | 200 |

TABLE 4-continued

|  |  | Example 13 | Example 14 | Comparative Example 7 | Comparative Example 8 |
|---|---|---|---|---|---|
| Luminescent layer | Maximum thickness (μm) | 480 | 375 | 400 | 300 |
|  | Minimum thickness (μm) | 90 | 300 | 100 | 300 |
|  | Maximum thickness (μm) | 140 | 350 | 300 | 500 |
|  | Shape | Wedge shape | Wedge shape | Wedge shape | Wedge shape |
| Interlayer film | Minimum thickness (μm) | 800 | 800 | 800 | 800 |
|  | Maximum thickness (μm) | 1200 | 1200 | 1200 | 1200 |
|  | Wedge angle θ (mrad) | 0.4 | 0.4 | 0.4 | 0.4 |
| Evaluation | Evaluation of occurance of double image phenomenon | ○ | ○ | ○ | ○ |
|  | Evaluation of luminance variation | 728 | 798 | 731 | 790 |
|  |  | 760 | 812 | 954 | 1020 |
|  | Evaluation of luminance variation | ○ | ○ | x | x |

INDUSTRIAL APPLICABILITY

The present invention provides an interlayer film for laminated glass which prevents a double image phenomenon in a specific area of laminated glass and enables display of high contrast images at a luminance within a certain range. The present invention also provides a laminated glass including the interlayer film for laminated glass.

REFERENCE SIGNS LIST

1 Interlayer film for laminated glass
11 Luminescent layer
12 Shape-adjusting layer
2 Interlayer film for laminated glass
21 Luminescent layer
22 Shape-adjusting layer
23 Shape-adjusting layer
3 Interlayer film for laminated glass
31 Luminescent layer
32 Shape-adjusting layer
33 Shape-adjusting layer

The invention claimed is:

1. An interlayer film for laminated glass, having a multilayer structure comprising:
   a luminescent layer comprising a thermoplastic resin, a plasticizer and a luminescent material; and
   a resin layer comprising a thermoplastic resin and a plasticizer on at least one surface of the luminescent layer,
   wherein the amount of the luminescent material in the luminescent layer is 0.005 to 5 parts by weight based on 100 parts by weight of the thermoplastic resin,
   the interlayer film for laminated glass has a wedge-shaped cross-sectional shape, and
   the luminescent layer has a difference between a maximum thickness and a minimum thickness of 100 μm or less.

2. The interlayer film for laminated glass according to claim 1,
   wherein the interlayer film for laminated glass has a wedge-shaped cross-sectional shape with a wedge angle θ of 0.1 to 1 mrad.

3. The interlayer film for laminated glass according to claim 1,
   wherein each of the thermoplastic resins contained in the luminescent layer and the resin layer is a polyvinyl acetal resin.

4. The interlayer film for laminated glass according to claim 3,
   wherein the polyvinyl acetal resin contained in the luminescent layer has a lower hydroxy group content than the polyvinyl acetal resin contained in the resin layer.

5. A laminated glass, comprising:
   a pair of glass sheets; and
   the interlayer film for laminated glass according to claim 1 between the glass sheets.

6. The interlayer film for laminated glass according to claim 2,
   wherein each of the thermoplastic resins contained in the luminescent layer and the resin layer is a polyvinyl acetal resin.

7. The interlayer film for laminated glass according to claim 6,
   wherein the polyvinyl acetal resin contained in the luminescent layer has a lower hydroxy group content than the polyvinyl acetal resin contained in the resin layer.

8. A laminated glass, comprising:
   a pair of glass sheets; and
   the interlayer film for laminated glass according to claim 2 between the glass sheets.

9. A laminated glass, comprising:
   a pair of glass sheets; and
   the interlayer film for laminated glass according to claim 3 between the glass sheets.

10. A laminated glass, comprising:
    a pair of glass sheets; and
    the interlayer film for laminated glass according to claim 6 between the glass sheets.

11. A laminated glass, comprising:
    a pair of glass sheets; and
    the interlayer film for laminated glass according to claim 4 between the glass sheets.

12. A laminated glass, comprising:
    a pair of glass sheets; and
    the interlayer film for laminated glass according to claim 7 between the glass sheets.

* * * * *